US007593723B2

(12) United States Patent
Zarom

(10) Patent No.: US 7,593,723 B2
(45) Date of Patent: Sep. 22, 2009

(54) MODULAR PERSONAL DEVICE SYSTEM

(76) Inventor: Rony Zarom, 210 E. 65th St. PH-B, New York, NY (US) 10021

( * ) Notice: Subject to any disclaimer, the term of this patent is extended or adjusted under 35 U.S.C. 154(b) by 341 days.

(21) Appl. No.: 10/476,177

(22) PCT Filed: May 9, 2002

(86) PCT No.: PCT/IL02/00364

§ 371 (c)(1), (2), (4) Date: Nov. 5, 2003

(87) PCT Pub. No.: WO02/091212

PCT Pub. Date: Nov. 14, 2002

(65) Prior Publication Data

US 2004/0137935 A1 Jul. 15, 2004

Related U.S. Application Data

(60) Provisional application No. 60/289,807, filed on May 10, 2001, provisional application No. 60/307,851, filed on Jul. 27, 2001.

(51) Int. Cl.
*H04M 3/00* (2006.01)

(52) U.S. Cl. ....................... 455/420; 455/418; 455/557; 455/556.1; 455/556.2; 455/558; 455/90.1; 455/90.2; 455/575.8; 455/88; 455/41.2; 455/410; 455/411

(58) Field of Classification Search ... 455/556.1–556.2, 455/557–559, 90.1–90.3, 575.1, 9, 344–347, 455/410–411, 418–420, 41.1–41.2, 88, 550.1, 455/552.1, 553.1, 575.8–575.9
See application file for complete search history.

(56) References Cited

U.S. PATENT DOCUMENTS

| | | | | |
|---|---|---|---|---|
| 5,594,952 | A * | 1/1997 | Virtuoso et al. | 455/557 |
| 5,628,055 | A * | 5/1997 | Stein | 455/575.1 |
| 6,243,578 | B1 * | 6/2001 | Koike | 455/557 |
| 6,725,061 | B1 * | 4/2004 | Hutchison et al. | 455/557 |
| 6,771,981 | B1 * | 8/2004 | Zalewski et al. | 455/557 |
| 6,898,283 | B2 * | 5/2005 | Wycherley et al. | 379/433.11 |
| 2002/0025796 | A1 * | 2/2002 | Taylor et al. | 455/406 |

FOREIGN PATENT DOCUMENTS

| | | |
|---|---|---|
| EP | 0670638 | 6/1995 |
| WO | WO 94/21058 | 9/1994 |
| WO | WO 94/29968 | 12/1994 |
| WO | WO 95/34958 | 12/1995 |
| WO | WO 98/48522 | * 10/1998 |
| WO | WO 99/66414 | 12/1999 |

* cited by examiner

*Primary Examiner*—Tuan A Tran
(74) *Attorney, Agent, or Firm*—Mintz, Levin, Cohn, Ferris, Glovsky and Popeo, P.C.; David F. Crosby

(57) ABSTRACT

A modular personal device system, in which the system has two parts: a core module and a shell module. The overall functionality available to the combined system is divided between the core module and the shell module such that a single core module is operable with a plurality of different types of shell modules.

47 Claims, 8 Drawing Sheets

10
54
14
SMART PHONE SHELL
40
LCD/TS
46
KEYBOARD
50
CPU
52
SDRAM
FLASH
51
USB
56
CHARGING
44
VIBRATOR
43
BATTERY
48
IrDa
42
CODEC
28
38
34
39
32
36
ANTENNA
IrDa
DC POWER
LCD/TS
AUDIO ANALOG
SERIEL
30
12
CORE
PHONE MODULE RF (WISMO)
16
SIM
18
CPU
22
SDRAM
24
FLASH
26
RTC BATTERY
20

MODULAR PERSONAL DEVICE SYSTEM

RELATED PATENT APPLICATION

This application is a National Phase Application of PCT/IL02/00364 International Filing Date 9 May 2002, which claims priority from U.S. Provisional Patent Application No. 60/289,807 filed 10 May 2001, and U.S. Provisional Patent Application No. 60/307,851 filed 27 Jul. 2001, all of which are hereby incorporated by reference as if fully set forth herein.

FIELD OF THE INVENTION

The present invention is of a modular personal device system, and in particular, of such a system in which the overall functionality of the device is divided between a core module and a shell module, such that a single core module is operable with a plurality of different types of shell modules. The core module preferably features a reusable wireless communication module, thereby reducing cost, as the core module is preferably usable with a plurality of shell modules. The wireless communication module more preferably supports a plurality of different types of wireless communication systems. Optionally and more preferably, the core module is able to store personal information of the user, which can then be used with a plurality of shell modules.

BACKGROUND OF THE INVENTION

The use of small, portable, hand-held electronic devices has become prevalent recently, particularly for cellular telephones and PDA (personal data assistant) devices. Many individuals own several different electronic devices, which have slightly different yet overlapping functions. Manipulating, carrying and storing several of these devices are time-consuming and inefficient, such that a more efficient solution would be desirable. In addition, different types of devices are more suitable for different types of activities.

Attempts have been made to combine various functions into a single device, but the resultant devices have typically proved to be too large, heavy and bulky for efficient use. Furthermore, the users of these devices do not necessarily need to be able to use all of the functions simultaneously, but may instead prefer to use only a subset of functions at any given moment. On the other hand, users do want to be able to carry at least those functions, in a portable format, which are used most frequently. Therefore, the currently available solutions clearly have a number of drawbacks.

Examples of such attempted solutions are disclosed in U.S. Pat. No. 6,216,185, which teaches a system in which a portable component, which contains the actual high-level functional components of the device (the CPU, sufficient software for operating the device, and personal information about the user) is attached to a console. The console provides the input devices such as a mouse and keyboard, a display device and so forth. Therefore, the console provides the peripheral devices, while the portable component provides the computational power for the device. However, this system has a number of disadvantages. In particular, the expensive components of the computer, such as the CPU, operating system software, memory and so forth, are all contained within the portable component. Therefore, each user must purchase these expensive components, thereby increasing the expensive of the portable component for each user.

PCT Application No. WO 94/00970 discloses a modular notebook computer, which features a framework with module bays for receiving various modules such as the CPU, power, floppy disk, RAM memory, and so forth. However, clearly the requirement for many different modules decreases the portability of such modules, since the user would not wish to carry many modules between different frameworks. Therefore, the modules are not sufficiently reusable.

PCT Application No. WO 92/18924 discloses a modular computer, in which a docking station features the monitor, keyboard and so forth, which is intended to remain stationary. A portable module contains the CPU and memory. Again, the expensive components of the computer, such as the CPU, operating system software, memory and so forth, are all contained within the portable component. Therefore, each user must purchase these expensive components, thereby increasing the expensive of the portable component for each user.

SUMMARY OF THE INVENTION

The background art does not teach or suggest a core module which does not feature expensive components. The background art also does not teach or suggest a core module which is functional with many different types of shell modules, which receive the core module and which provide various functions to the user.

The present invention overcomes these deficiencies of the background art by providing a modular personal device system, in which the system has two parts: a core module and a shell module. The overall functionality available to the combined system is divided between the core module and the shell module such that a single core module is operable with a plurality of different types of shell modules. The core module therefore has a subset of features, which are generic to, or otherwise suitable for, a plurality of the different types of shell modules. Preferably, the core module features components for wireless communication, such that the combination of the core module and shell module preferably provides a cellular telephone. The shell module more preferably features at least input and output components, for receiving input from the user and for output to the user. Optionally and more preferably, the shell module also features data transmission components, for sending and receiving e-mail messages, for example.

Hereinafter, the terms "computer" or "computational device" refer to a combination of a particular computer hardware system and a particular software operating system. Examples of such hardware systems include those with any type of suitable data processor. Hereinafter, the terms "computer" or "computational device" include, but are not limited to, personal computers (PC) having an operating system such as DOS, Windows™, OS/2™ or Linux; Macintosh™ MacOS computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; any other device featuring known and available operating system; as well as any type of device which has a data processor of some type with an associated memory. Hereinafter, the term "Windows™" includes but is not limited to Windows95™, Windows NT™, Windows98™, Windows CE™ Windows 2000, Windows Millennium and any upgraded versions of these operating systems by Microsoft Corp. (USA).

Hereinafter, the term "cellular communication device" refers to any type of wireless handset or device, including but not limited to cellular telephones or other types of computational device as defined above, which is capable of voice and/or data transfer through a radio frequency signal, optionally through a connection to the PSTN (public switched telephone network).

Hereinafter, the term "wireless communication system" includes but is not limited to, any type of wireless transmission protocol, bandwidth, and modulation of the signal. "Wireless communication" includes but is not limited to any type of communication which uses a radio frequency signal.

For the present invention, a software application could be written in substantially any suitable programming language, which could easily be selected by one of ordinary skill in the art. The programming language chosen should be compatible with the computer by which the software application is executed, and in particularly with the operating system of that computer. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware, or a combination thereof.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
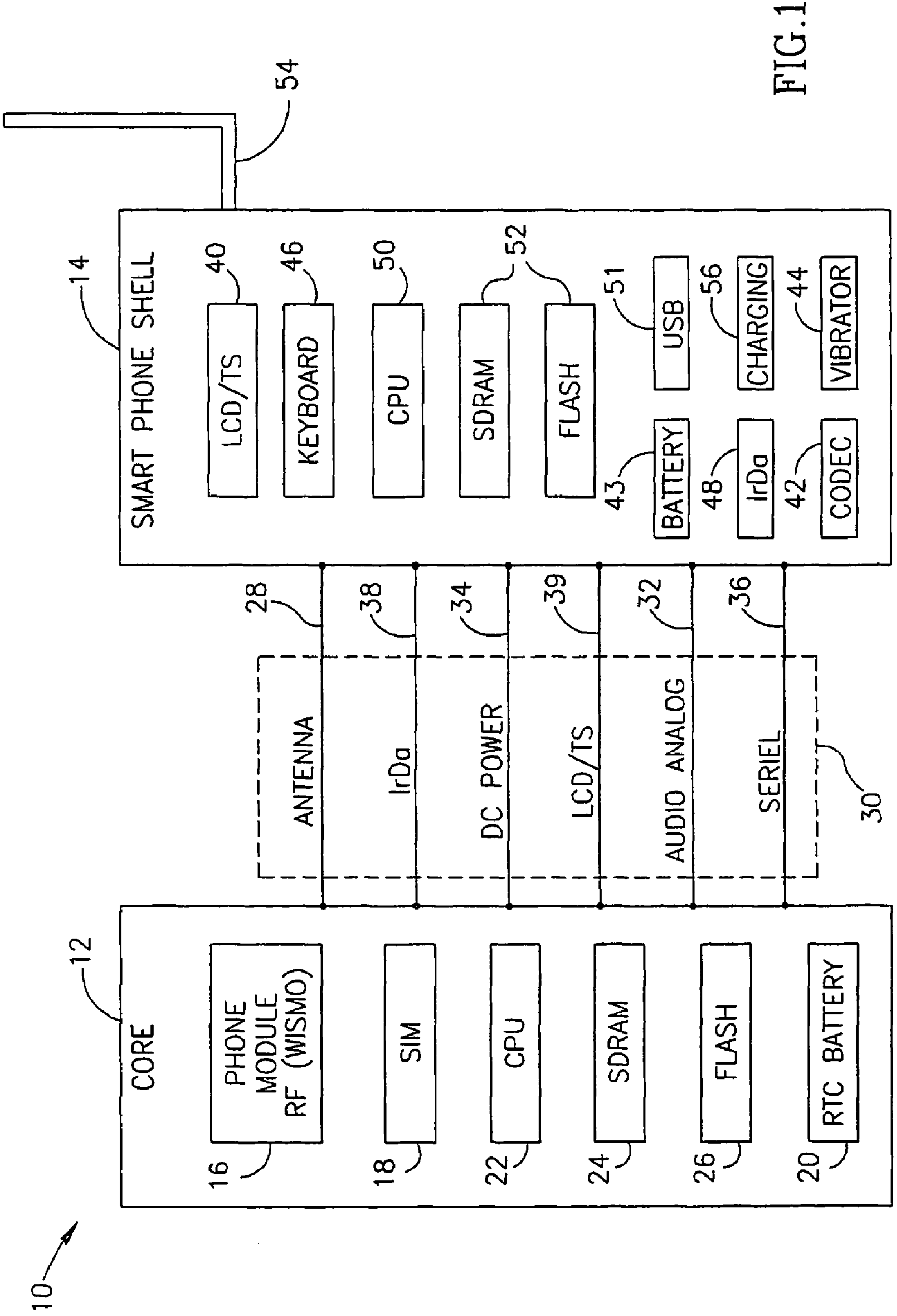
FIG. 1 is a schematic block diagram showing a first embodiment of a cellular telephone system according to the present invention.

The present invention is of a modular personal device system, in which the system has two parts: a core module and a shell module. The overall functionality available to the combined system is divided between the core module and the shell module such that a single core module is preferably operable with a plurality of different types of shell modules. According to a preferred embodiment of the present invention, the modular personal device system is capable of wireless communication, for example, as a cellular telephone. Preferably, the components for wireless communication are located at the core module, more preferably including a modem for data and/or voice transmission. The shell module more preferably features at least input and output components, for receiving input from the user and for output to the user. Optionally and more preferably, the shell module also features data transmission components, for sending and receiving e-mail messages, for example.

The core module has a subset of features, which are generic to, or otherwise suitable for, a plurality of the different types of shell modules. The core module preferably includes a phone module, as well as other basic hardware features. By "phone module" it is meant any type of module which is known in the art for supporting any type of wireless communication. However, optionally and preferably, the core module does not feature the CPU, memory or software for operating the combination of the core and shell modules, such that the shell module provides these components for operating the combined system. The core module may optionally feature memory, and optionally and preferably features an additional CPU. Alternatively, the core module features a CPU which operating the combination of the core and shell modules.

According to preferred embodiments of the present invention, the core module preferably includes support for user personalization, for example by storing user information, as well optionally by including personalized versions of software for supporting the operating system of the combined device, if any.

More preferably, the core module includes other hardware features that may be used with a plurality of different shell modules. One example is a phone module for wireless communication, which is suitable for providing cellular telephone functions and also for a modem for data and/or voice transmission.

According to a preferred embodiment of the present invention, the core module features components for wireless communication, such as a phone module and/or SIM chip for example, in combination with personalization information and/or support for other types of personalization, which is preferably customized by the user of that core module. A power source, or at least as connector which is connectable to a power source, is also preferably present at the core module. Most preferably, for this embodiment of the core module according to the present invention, the core module does not feature an additional CPU or other component, apart from these specific listed components.

The shell module preferably includes access features for interacting with the user, such as input functions and a display. For example, the shell module preferably includes a keypad, for a restricted or full keyset, a mouse or other pointer device, or a combination thereof. Preferably, the shell module also features a CPU, which more preferably controls the operation of the combination of the shell module and the core module.

According to a first embodiment of the present invention, for a modular personal device system for wireless communication, the shell module is designed to provide features for the functions of a cellular telephone, including a restricted keyset which is suitable for a cellular telephone, a suitable display and optionally also a power source, such as a battery for example. Optionally, the shell may feature an infrared transmission unit (IrDA). The CPU is preferably located at the phone module of the shell module.

These features of the shell module interact with the core module, which preferably includes a phone module, a SIM and optionally also a power source. The phone module preferably includes a RF (radio frequency) transmitter/receiver module, a baseband module and memory. However, the physical antenna is preferably located at the shell module, such that the RF transmitter/receiver module is preferably directly connected to the physical antenna, when the core module is combined with the shell module. In addition, the power source of the core module, such as a battery, preferably also supports a real time clock, such that the real time clock does not need to be reset each time the core module is disconnected from the shell module.

The same core module may optionally be used with a different type of shell module, as a PDA (personal data assistant) device, including a full keyset, a suitable display and optionally also a power source, such as a battery for example. These features interact with the core module as described above. For example, the phone module could optionally include a modem, for coupling to data input and output functions at the shell, for transmitting/receiving data, sending and receiving e-mail messages, and so forth, as well as optionally for voice communication.

According to other preferred embodiments of the present invention a single shell module may be used with different types of core modules. For example a mobile phone module may be used with one core module that supports GSM (global system for mobile communication) and another core module that supports CDMA (code division multiple access).

According to a second embodiment of the present invention, the processor, such as a CPU for example, is optionally located at both the core module and the shell module, for controlling respective functions at each module. Although the processor at the core module may optionally provide overall control of both modules, more preferably such control is divided between the processors of the different modules.

According to other preferred embodiments of the present invention, there is provided a core module, containing a central processor, memory and various controllers carried by a computer board and encased within a protective housing. Conventional external contacts are provided for electrical communication with a connector or docking station for the core module. In one embodiment, the connector is integral with the various shells. In another embodiment, the connector may be housed within a separate, stand alone, housing provided with additional connectors for selected peripheral devices such as displays, speakers, etc.

Shell modules may optionally be constructed for various consumer electronic devices such as wireless communication device, a digital camera, a personal digital assistant, electronic game, DVD player, toy, or other computerized device.

In one aspect, the present invention is a system comprising a self contained core module or card including a central processor with an operating system and memory; a docking station or slot connector for removably receiving the core module; and at least one shell consumer electronics device including at least one input/output device associated therewith, the consumer electronics device being operably connected to the docking station so that an operable consumer electronics device is formed when the core module is removably received in the docking station.

In one embodiment, the docking station and the shell module are integrated into a common housing, and in another embodiment, the docking station and the shell module are separately housed and the docking station includes a connection for at least one input/output device so that the docking station may be used with the core module and the at least one input/output device independently of the shell module. It should be noted that even when integrated into a common housing, the docking station and the shell module are not necessarily permanently connected, to each other and/or to the common housing.

The present invention includes a preferred embodiment of a method for providing a family of consumer electronic devices comprising: providing a plurality of consumer shell modules having at least one associated peripheral device, wherein the shell module lacks at least one function for a consumer electronics device; providing a core module having at least said at least one function to enable the operation of each of the plurality of consumer electronics devices when removably in communication with the shell module; and selectively inserting the core module into a shell module to thereby enable the operation of the combination of the shell module and core module as the consumer electronic device.

In another method, one of a plurality of consumer electronics devices may be customized for an individual user by first providing a self contained core module including at least memory. The core module is then customized with information unique to the user. Next, a plurality of consumer electronic device shell modules are provided, which are inoperable without the core module, with each shell module optionally containing a docking station for removably receiving the core module. Next, the core module is selectively placed in contact with the docking station of one of the plurality of shell modules to thereby operationally render the consumer electronics device operable according to information unique to the user. The core module is optionally and more preferably inserted into the docking station of the shell module for being placed in contact.

The principles and operation of a system according to the present invention may be better understood with reference to the drawings and the accompanying description.

Referring now to the drawings, FIG. 1 shows a system 10 according to the present invention for an exemplary cellular telephone or cellular communication device combination, including a core module 12 and a telephone shell module 14. Telephone shell module 14 is shown in an optional but preferred implementation, as a "smart" telephone shell module. The exemplary cellular telephone combination formed by system 10 is preferably suitable for the transmission of voice communication and/or data transmission, such as for e-mail messages, for example.

As shown, core module 12 features a phone module 16, a SIM memory 18 which is optionally removable, and optionally a battery 20 or other power source. Battery 20 is optionally provided for powering a real time clock (not shown).

Phone module 16 preferably includes sufficient components for wireless communication, more preferably including voice transmission and/or transmission of other types of data, depending on the capabilities of the corresponding components on telephone shell module 14. Thus, the extent of the capabilities of system 10 is preferably not limited by the characteristics of core module 12.

Phone module 16 preferably connects to telephone shell module 14 through a first antenna connector 28 for connecting to an antenna 54 on telephone shell module 14. First antenna connector 28 is optionally and more preferably a direct connector, such that phone module 16 is preferably directly connected to antenna 54. First antenna connector 28 may optionally "plug into" or otherwise be in direct physical contact with antenna 54.

Optionally and more preferably, core module 12 also connects to telephone shell module 14 through a second set of connectors 30. Second set of connectors 30 more preferably includes an audio connection 32, a DC power connection 34, a serial connection 36 and optionally an infrared connection 38. Each of the second set of connectors 30 then connects to a corresponding feature of telephone shell module 14. For example, a display connection 39 is more preferably made to a display 40, which is more preferably an LCD (liquid crystal display) or other suitable type of display.

Audio connection 32 preferably connects to an audio device 42 on telephone shell module 14, which more preferably includes a speaker and CODEC. Serial connection 36 preferably connects to a keyboard 46. Optionally display 40 may be implemented as a touch sensitive device in which case it may have some or all of the functionality of keyboard 46 and the inclusion of keyboard 46 in phone module would then be optional. Infrared connection 38 allows communication between core module 12 and an infrared transmitter/receiver 48 on telephone shell module 14. Also optionally, telephone shell module 14 features a vibrator 44, for example in order to produce vibrations in place of a ring tone.

According to an optional implementation of the present invention, telephone shell module 14 only includes display 40, audio device 42, and keyboard 46. Alternatively, telephone shell module 14 also includes data transmission capabilities for transmitting data messages and/or other types of data, for example with regard to infrared transmitter/receiver 48.

Telephone shell module 14 preferably features a CPU 50, which also optionally includes memory 52 (such as RAM or flash memory, or a combination thereof). Alternatively, all such data processing functions could be located only at core module 12, for example through a CPU 22, which optionally also features a first memory 24, such as SDRAM for example, and also optionally features a second memory 26, such as a Flash memory for example. Also optionally and alternatively, system 10 could feature both CPU 50 and CPU 22. More preferably, however, only telephone shell module 14 features CPU 50, while core module 12 does not feature CPU 22.

The choice of one or both of CPU 50 and/or CPU 22 also determines which component of system 10 controls the remaining components. For example, if only CPU 50 is present, then telephone shell module 14 preferably controls system 10. CPU 50 may optionally read information from SIM chip 18 and/or another memory on telephone shell module 14, such as first and/or second memory 24, 26 for example. Such an option is preferred for the preferred embodiment of the present invention in which user personalization information is stored on telephone shell module 14, thereby enabling the function of system 10 to be personalized according to one or more parameters selected by the user.

CPU 50 also preferably operates the operating software in such an embodiment, for operating system 10 and hence for providing a wireless communication device as an example of a consumer electronic device, more preferably as a cellular telephone. The operating software is preferably stored on memory 52 of telephone shell module 14, although alternatively a portion may be stored on a memory of core module 12, for example for the preferred embodiment of personalization information being stored on core module 12. The operating software preferably includes different types of functions, selected according to the type of shell module, such as telephone shell module 14, or a PDA or digital camera (described in greater detail below).

Alternatively, if only CPU 22 is present, then CPU 22 controls system 10, such that the operating software is preferably stored on first and/or second memory 24, 26. If both CPU 50 and CPU 22 are present, then control is preferably shared, although alternatively one of CPU 50 and CPU 22 could be the "master" controlling CPU for system 10. The functions of the operating software are described in greater detail below.

In any case, at least some software instructions are more preferably stored on first and/or second memory 24, 26, most preferably for performing particular functions for phone module 16, such as for data transmission and/or voice communication. In the case of certain embodiments of the shell module described below, these software instructions could optionally enable phone module 16 to provide modem functions.

Turning back to connections 30, DC connector 34 preferably connects a power source 56 on telephone shell module 14 to battery 20 on core module 12. Battery 20 is preferably rechargeable through DC connector 34 to power source 56. More preferably, battery 20 provides power to a real time clock (not shown), such that the real time clock does not need to be reset each time core module 12 is disconnected from telephone shell module 14. Another optional power source is a battery 47 on telephone shell module 14. Another optional but preferred feature is a USB port 51 on telephone shell module 14.

Figure 2:
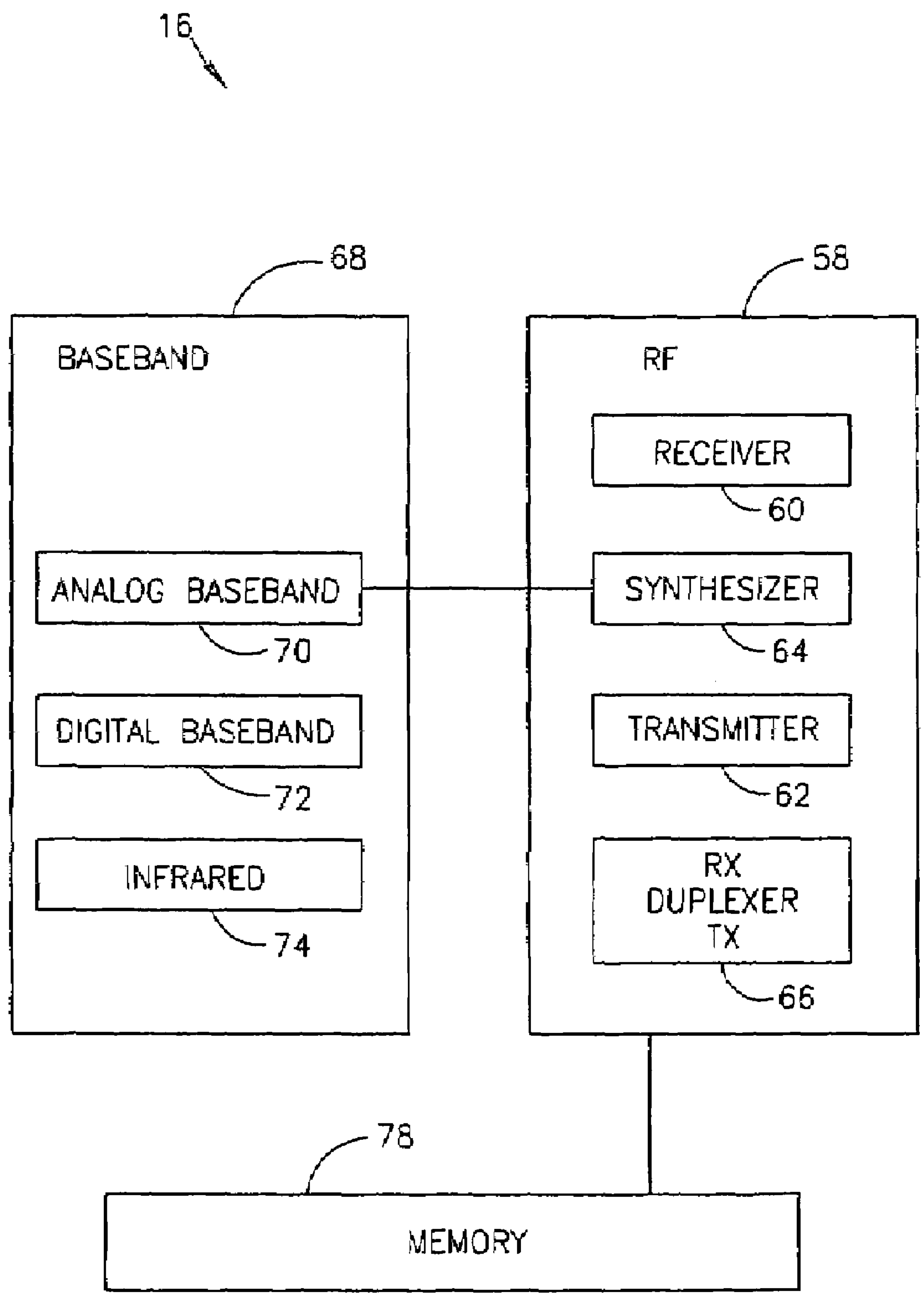
FIG. 2 is a schematic block diagram of an exemplary phone module for use with the system of FIG. 1.

FIG. 2 shows an illustrative embodiment of phone module 16. Phone module 16 may optionally be implemented according to the background art, from "off the shelf" components. As shown, phone module 16 preferably includes an RF module 58, with a receiver 60, transmitter 62, synthesizer 64 and duplexer 66. These components are in communication with a baseband module 68, featuring an analog baseband 70, a digital baseband 72, and optionally an infrared component 74, which is in communication with any infrared device on the shell module. Analog baseband 70 and digital baseband 72 preferably operate at a low frequency in order to facilitate data handling at a frequency which is close to the frequency of voice. Digital baseband 72 is preferably in communication with a CPU on the corresponding shell module (not shown), in order for the CPU to be able to control digital baseband 72 for data and/or voice transmission, for modem functions. Phone module 16 optionally and more preferably features an additional memory 78 (such as RAM or flash memory, or a combination thereof). Optionally, all or a portion of these components are purchased "off the shelf", as these components are well known in the art and could easily be selected by one of ordinary skill in the art.

Figure 3:
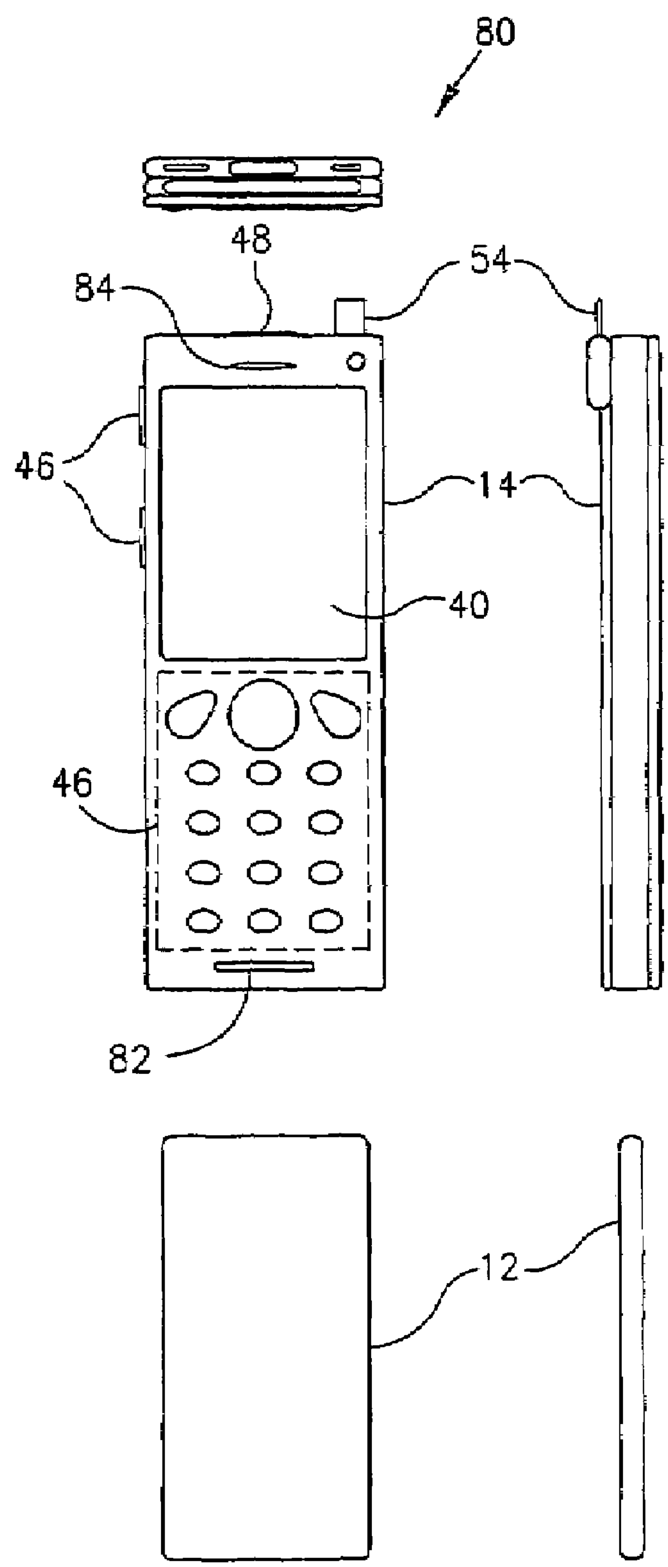
FIGS. 3 and 4 show two exemplary implementations of the combined telephone system according to the present invention.

FIG. 3 shows an exemplary implementation of a combined telephone system 80 according to the present invention. As shown system 80 features core module 12 and shell module 14. Shell module 14 features display 40, keyboard 46, Infrared communication port 48, and antenna 54. Shell module 14 also preferably features a microphone 82 and speaker 84 which are more preferably both in communication with audio component 42 (not shown; see FIG. 1). A docking station 86 is shown on shell module 14.

Figure 4:
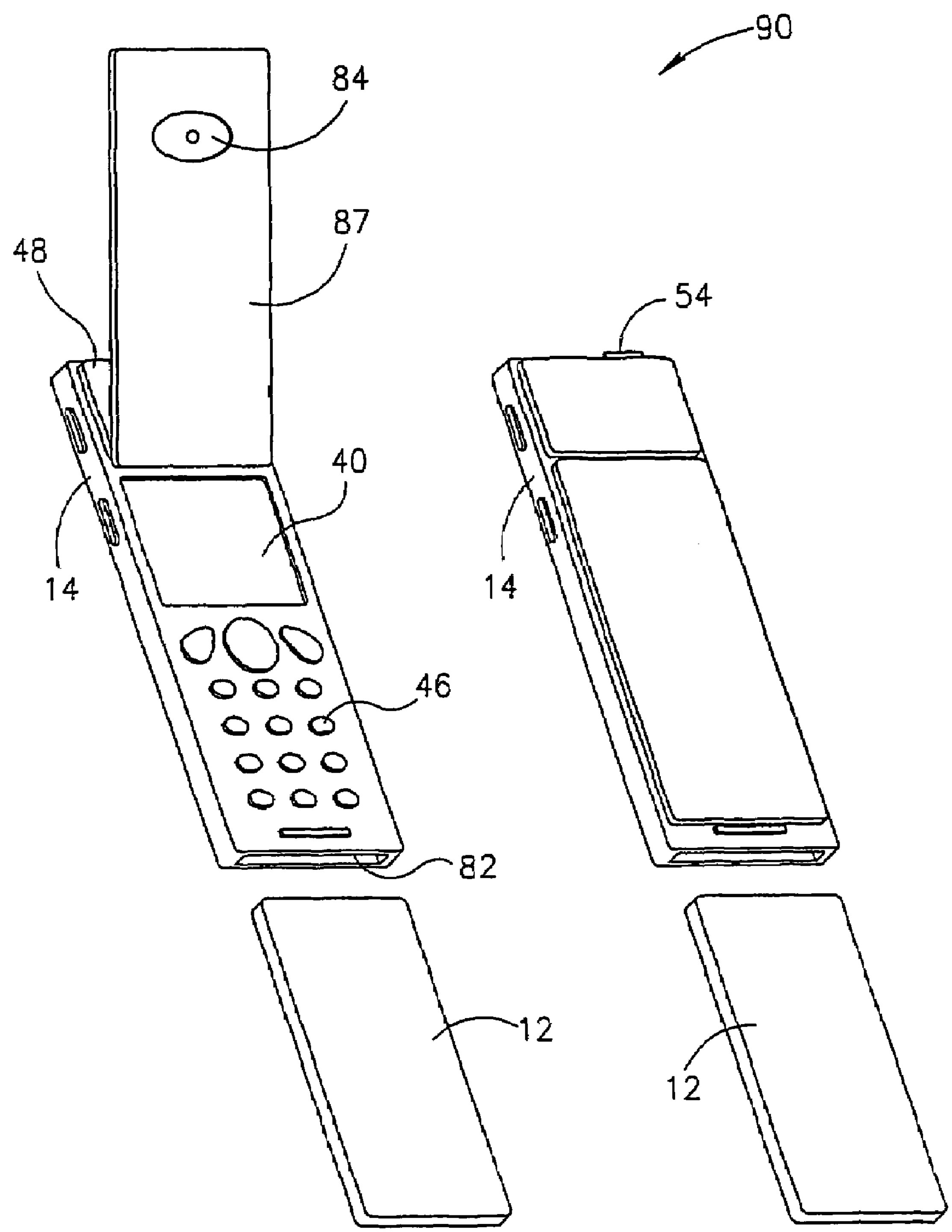

FIG. 4 shows a second exemplary implementation of a combined telephone system 90 according to the present invention. Similar or identical features are present in this embodiment as for FIG. 3, indicated by the identical reference numbers. Telephone shell module 14 also preferably features a flip-up cover 87 in this embodiment.

For either embodiment in FIG. 3 or 4, according to preferred embodiments of the present invention, there is provided different levels of functionality in the telephone shell module. For example, a more basic level of functioning may optionally include a lower cost and/or smaller display, a more basic keyboard with fewer keys and/or functions, a vibrator and an infra-red port. Such a basic level may optionally include other features, but generally is intended to provide sufficient functionality to enable the combined system as a cellular telephone.

More extended functionality may optionally include a higher resolution, larger and/or color display on the telephone shell module, an extended keyboard with a greater number of keys and/or functions, a vibrator and an infra-red port. Further optional additions may include, but are not limited to, an additional CPU and memory, a touch sensitive screen, a multimedia memory card (MMC), a media player such as an MP3 player for example, a video player such as a MPEG4 player for example, a speakerphone function for "hands free" conversation, and a USB connection. The resultant shell module may be described as a personal data assistant (PDA), but in any case would provide many more functions and a higher level of computational power.

The different levels of hardware function are preferably also reflected in different levels of software function for the different exemplary embodiments of the combined system. For example, the telephone shell module having a lower level of hardware functionality may optionally feature one or more of a telephone book, a plurality of available ring tones, various images to be displayed, and one or more games to play. Optionally, for a greater level of function, the telephone shell module may feature one or more of an organizer, which is more preferably used for organizing and retrieving various types of user information on the core module (not shown); voice recognition technology, which is known in the art of cellular telephones for enabling a telephone number to be selected and dialed, for example; a voice memo function, for storing messages or "reminders" by the user; a calculator; and optionally some type of Web browser, such as a WAP browser for example.

However, for telephone shell modules having even higher levels of hardware functionality, as previously described, more preferably additional software functions are available. Optionally and more preferably, these additional software functions include one or more of computer software such as a word processing program, a spreadsheet program, a multimedia player program, and so forth. Therefore, the shell module preferably has both software and hardware functions which more preferably determine the overall level of functionality of the combined core module/shell module system.

Figure 5:
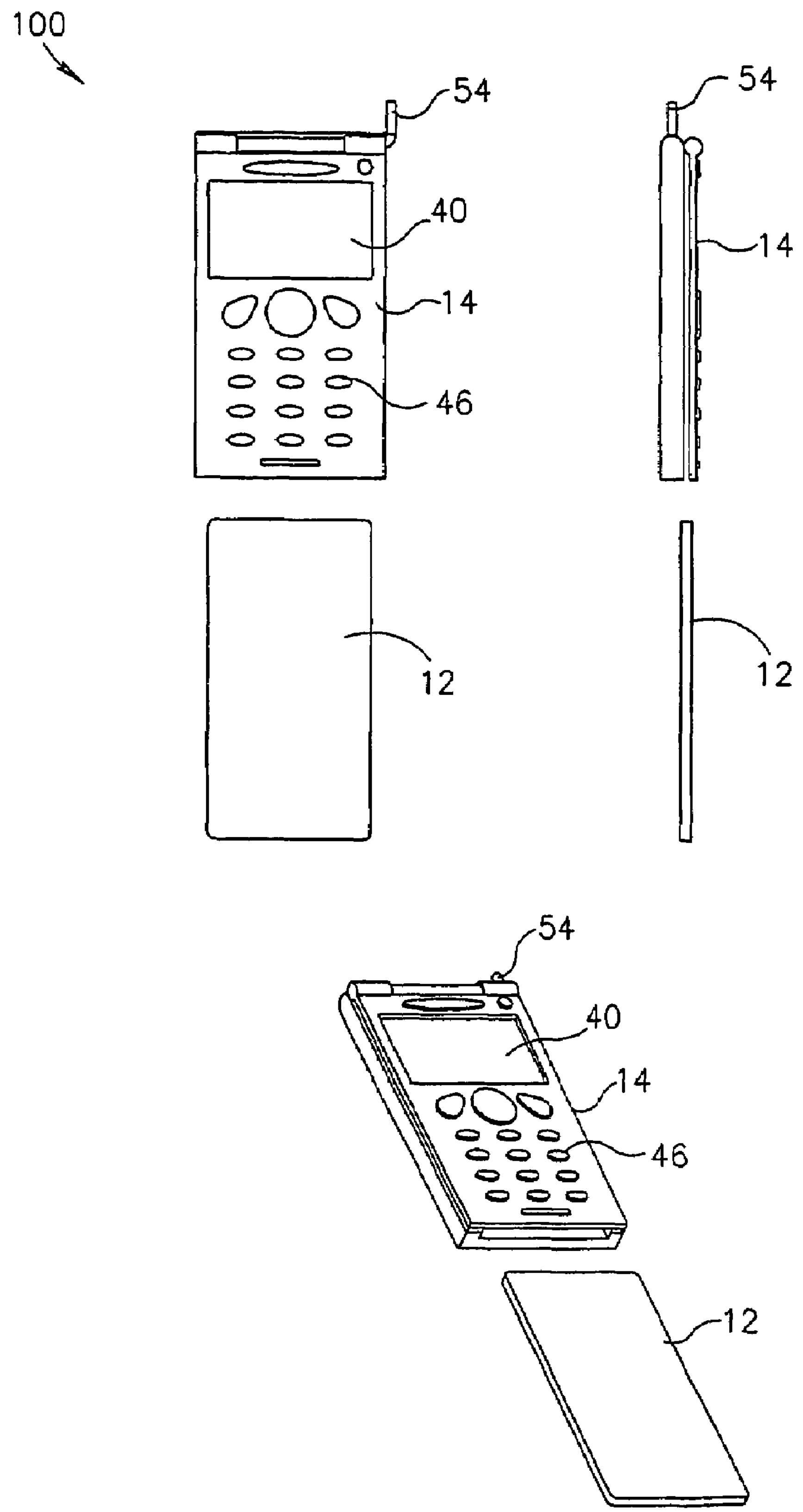
FIG. 5 shows an optional implementation of the present invention for a PDA (personal data assistant)

FIG. 5 shows an optional implementation of the present invention for a PDA (personal data assistant). As shown, a PDA system 100 feature a core module 12 and a shell module 14. Shell module 14 preferably includes a touch sensitive display 40, a keyboard 46 and an antenna 54. According to preferred embodiments of the present invention, shell module 14 for the PDA implementation can optionally be operated without core module 12; however, core module 12 preferably provides modem functions, and optionally and more preferably also provides user personalization information.

Figure 6:
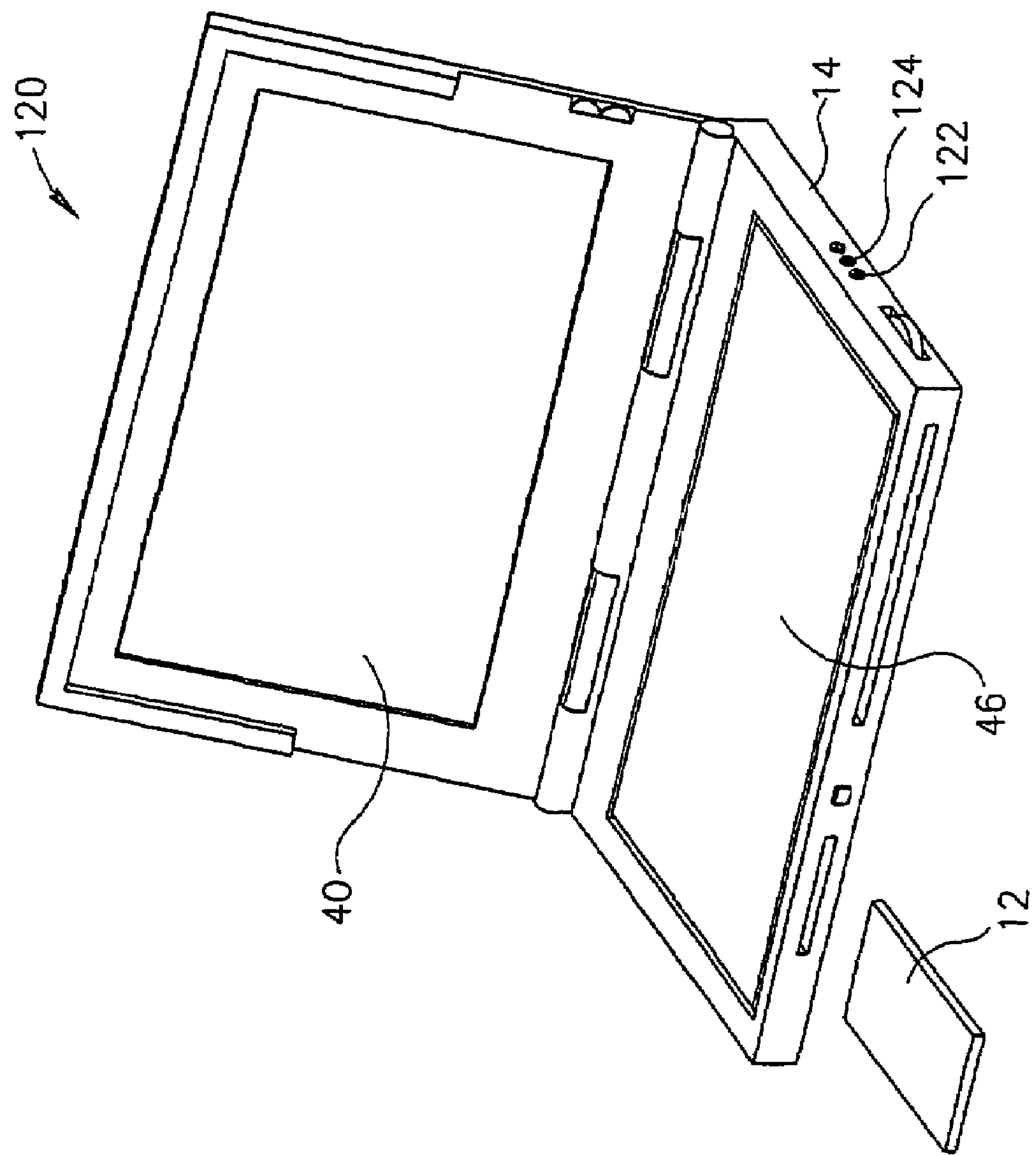
FIGS. 6 and 7 show exemplary implementations for a computer device according to the present invention.

FIG. 6 shows an exemplary implementation of a combined portable computer system 120 according to the present invention. As shown system 120 features a core module 12 and shell module 14. Shell module 14 features a display 40, a keyboard 46 and a microphone jack 122 and speaker jack 124 which are both in communication with audio component 42 (not shown). Core module 12 is preferably implemented as a slot in component such as a PCMCIA card, which may be installed in the appropriate slot in shell module 14. Shell module 14 can optionally and preferably be operated independently of core module 12; however, core module 12 preferably provides modem functions, and optionally and more preferably also provides user personalization information.

Figure 7:
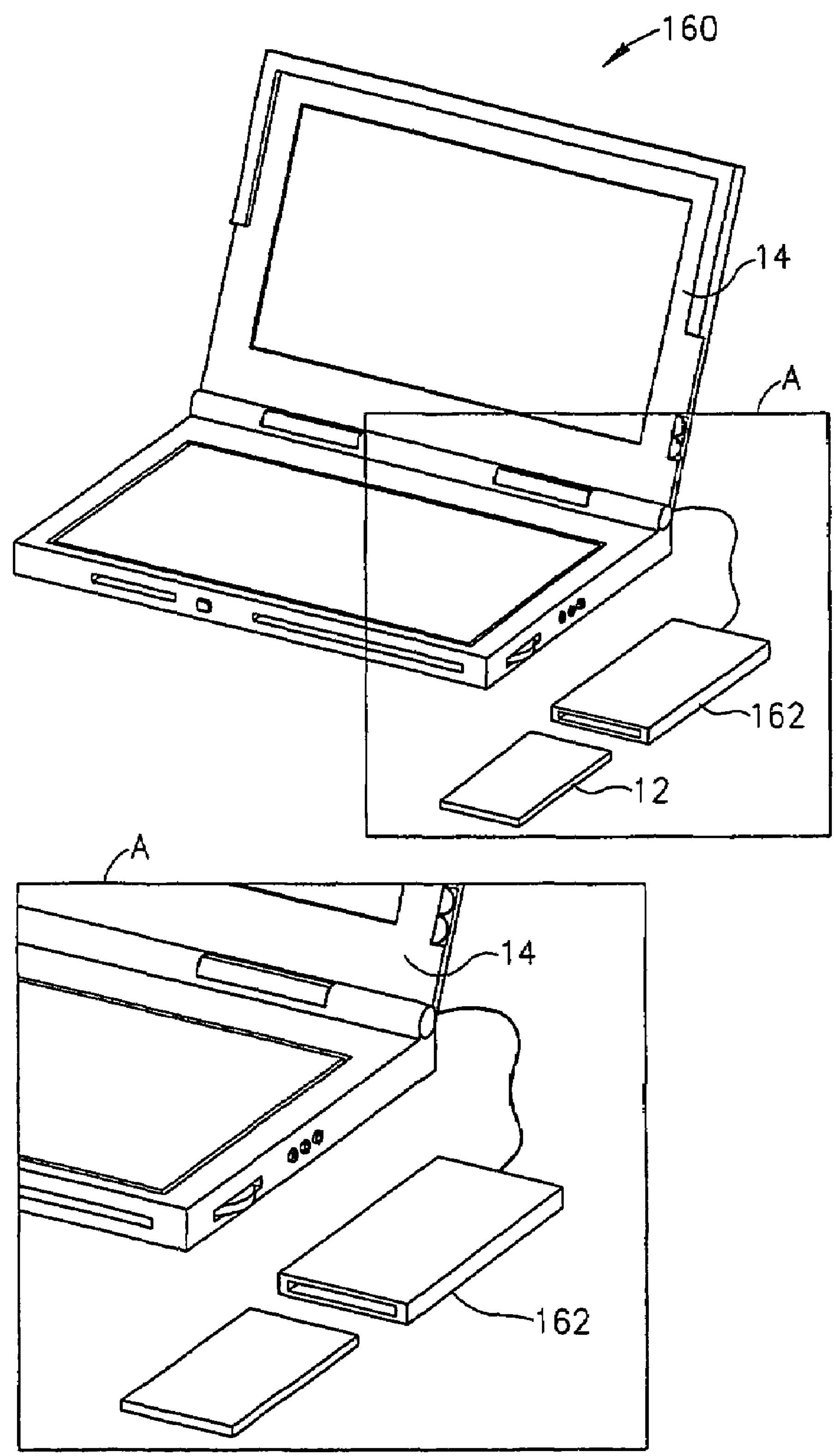

FIG. 7 shows an exemplary implementations of a combined computer system 160 according to the present invention (inset shows a magnified view of the portion of system 160 enclosed in a box A). As shown system 160 features a core module 12 and shell module 14. Shell module 14 is preferably implemented as a peripheral device 162, which may optionally be connected to shell module 14 by means of a standard cable connection such as RS232, USB, or FireWire or by means of a wireless connection such as Bluetooth or IrDa. Core module 12 is preferably implemented as a slot in component such as a PCMCIA card, which may be installed in the appropriate slot in shell module 14.

Figure 8:
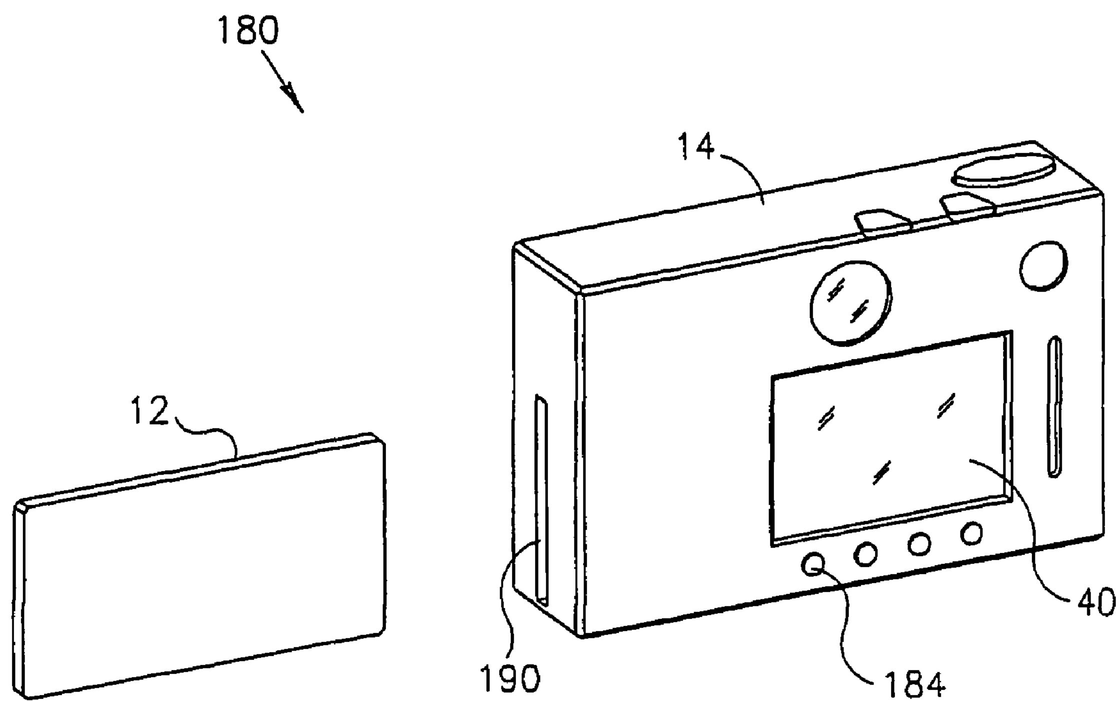
FIG. 8 shows an optional implementation of the present invention for a digital camera.
Figure 8:
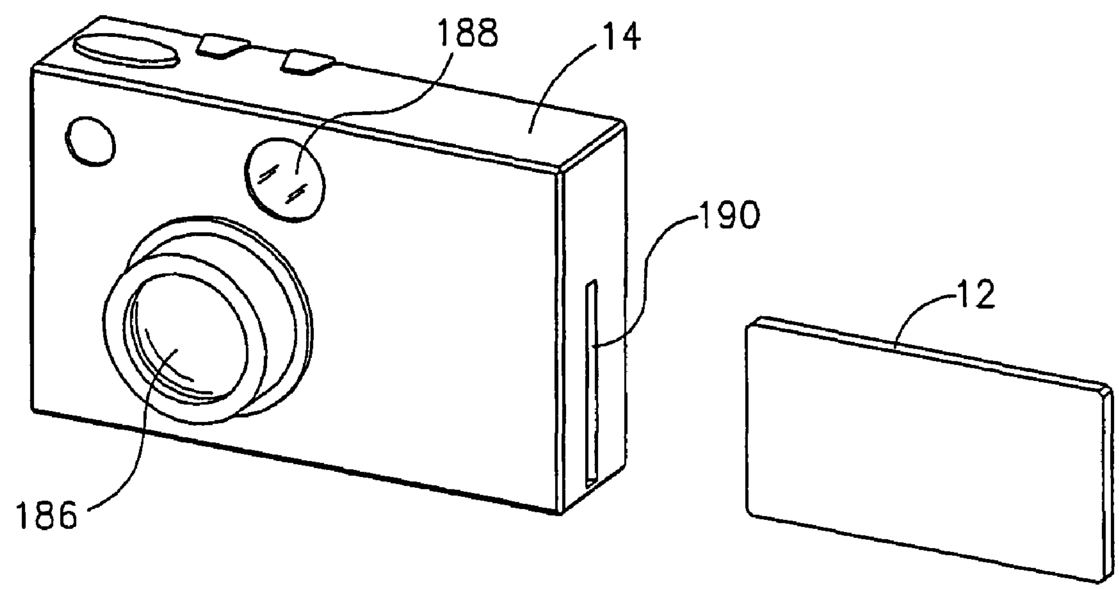

FIG. 8 shows an optional implementation of the present invention for a digital camera system 180. As shown system 180 features a core module 12 and shell module 14. Shell module 14 optionally and preferably features a touch sensitive display 40, one or more keys 184 and more preferably features an optical component 182 for recording images which may optionally be stored in the memory component of core module 12. Shell module 14 also preferably features functions suitable for a digital camera, such a lens 186, a flash light device 188, and so forth.

Core module 12 is preferably implemented as a slot in component such as a PCMCIA card, which may be installed in the appropriate slot in shell module 14, such as a slot 190 as shown. Shell module 14 can optionally and preferably be operated independently of core module 12; however, core module 12 preferably provides modem functions, and optionally and more preferably also provides user personalization information.

Regardless of the exact type of shell module which is coupled with the core module to provide the combined system, which more preferably is a consumer electronic device, according to a preferred embodiment of the present invention, the shell module and the core module are able to recognize when such a combination has been formed. Optionally and more preferably, such recognition occurs through a handshake procedure, in which one of the shell module and the core module initiates the procedure with a query to the other module. Most preferably, the initiating module contains the only CPU for the system, although alternatively the initiating module may contain the master CPU for the system. Most preferably, the shell module is the initiating module.

The core module (if the shell module initiates) then preferably responds with some type of identifier, which enables the shell module to identify the core module. The identifier could optionally be a string of numbers for example. Once the handshake procedure is complete, the shell module optionally and preferably reads some type of personalization information from a memory on the core module, which more preferably includes one or more personalization parameters. Shell module then preferably configures at least one function of the system according to the personalization information.

Alternatively or additionally, the shell module is able to recognize the functions or capabilities of the core module according to this identification. For example, the core module may optionally only be able to provide data transmission, for interaction with a digital camera shell; this limited functionality is preferably recognized by the shell module through the exchange of the identifier.

According to optional but preferred embodiments of the present invention, the core module is also able to identify the type of shell module, more preferably through an identifier which the core module receives from the shell module. Such identification enables the core module to interact with the shell module according to recognized capabilities of the shell module, for providing certain features for example. Alternatively or additionally, the specific shell module is so identified.

Next, preferably data synchronization is performed, for enabling the core module and shell module to function in combination, for forming the system according to the present invention.

The present invention has a number of advantages over the background art. One advantage is that the cost of each of the various consumer electronic devices may be significantly reduced by the omission of the CPU and the device operating system when forming the "shell" electronic device. This reduction in cost permits the user to acquire additional devices and to build, over time, a functionally enhanced system without learning new procedures. The reduction in the cost of the shell devices also facilitates the substitution of shells for cosmetic reasons. By way of example, the shell for a cellular telephone and by readily substituted to change the shape, size, color and styling of the telephone for work, casual and evening wear.

Another advantage is that the core module, which contains the CPU and operating system, is small in size and easily transported by the user to different environments, e.g. a home or office in a different city, where it may be inserted into a shell to form a complete operating device. Once the core module is installed into a shell device, the user is able to carry a personalized device with all of its memory and customization, thereby greatly facilitating the use of auxiliary or less commonly used devices.

The use of a common core module obviates the necessity for the duplicative entry of data into the databases of different devices, and eliminates the problem of incomplete updating of the data in the various devices. Archival data backups may be easily made to reduce the disruption and loss of data in the event of loss or damage to the core module.

The preferred implementation of the core module with telephone functionality, which is more preferably for wireless (and most preferably cellular telephone) communication, also enables the user to operate a wide variety of shell modules while still maintaining communication capabilities.

It will be appreciated that the above descriptions are intended only to serve as examples, and that many other embodiments are possible within the spirit and the scope of the present invention.

What is claimed is:

1. A system for a personal modular device, comprising:

a core module for providing at least one generic function wherein said core module is only operative when connected to a shell module, said core module-comprising a CPU, a radio transmitter/receiver and memory; and a plurality of different types of shell modules, each shell module providing at least one type-specific function and wherein each shell module is only operative when connected to the core module, such that a single core module is operable with a plurality of different types of shell modules, wherein said memory stores software for operating the system, such that said core module is adapted to identify the type of shell module it is connected to and enables one or more different type-specific functions according to the type of shell module identified.

2. The system of claim 1, wherein at least one single shell module is operable with a plurality of different types of core modules.

3. The system of claim 1, wherein said single core module is adapted to provide a set of features which are generic to said plurality of different types of shell modules.

4. The system of claim 1, wherein at least one shell module includes an input component for receiving input from a user and an output component for providing output to a user.

5. The system of claim 1, wherein said core module further includes a power source and a real time clock, such that when said core module is disconnected from said shell module, said real time clock receives power from said power source.

6. The system of claim 1, wherein said memory also stores personalization information.

7. The system of claim 6, wherein at least one function of said shell module is determined according to said personalization information.

8. The system of claim 1, wherein said core module comprises a SIM.

9. The system of claim 1, wherein at least one shell module comprises at least one of a keypad, keyboard or keyset.

10. The system of claim 9, wherein said keyset comprises a restricted keyset of a cellular telephone.

11. The system of claim 1, wherein at least one shell module comprises a display.

12. The system of claim 1, wherein each shell module comprises a power source.

13. The system of claim 12, wherein said power source comprises a battery.

14. The system of claim 1, wherein at least one shell module comprises an infrared transmission unit.

15. The system of claim 1, wherein said core module comprises a modem for data and/or voice transmission.

16. The system of claim 1, wherein at least one shell module comprises a pointing device.

17. The system of claim 16, wherein said pointing device is a mouse.

18. The system of claim 1, wherein said at least one type specific function is a cellular telephone and said core module supports communications with at least one of GSM (global system for mobile communication) networks and CDMA (code division multiple access) networks.

19. The system of claim 1, further comprising a connector for connecting said core module to said shell module.

20. The system of claim 19, wherein said connector is integrated with said shell module.

21. The system of claim 20, further comprising a separate housing for said connector.

22. The system of claim 21, wherein said separate housing comprises at least one additional connector for at least one peripheral device.

23. The system of claim 22, wherein said at least one peripheral device comprises at least one of a display and a speaker.

24. A personal modular device, comprising:

a core module adapted for providing at least one generic function wherein said core module is only operative when connected to a shell module, said core module comprising a phone module adapted for providing wireless communication, said core module comprising a CPU, a radio transmitter/receiver and memory; and a shell module of a plurality of different types of shell modules, each shell module providing at least one type-specific function and wherein each shell module is only operative when connected to the core module, such that a single core module is operable with a plurality of different types of shell modules, each adapted for providing a different type-specific function;

wherein said core module and said shell module in combination form the personal modular device, and wherein said memory stores software for operating the system, such that said core module is adapted to identify the type of shell module it is connected to and adapted to enable one or more type-specific functions according to the shell module identified.

25. A system for a personal modular device, comprising:

a core module for containing at least one generic function wherein said core module is only operative when connected to a shell module, said core module comprising a CPU, a radio transmitter/receiver and memory; and at least one of a plurality of different types of shell modules, each shell module being adapted to provide at least one type-specific function and wherein each shell module is only operative when connected to the core module, such that a single core module is operable with a plurality of different types of shell modules, wherein said memory stores software for operating the system, said software being personalized, such that said core module is adapted to identify the type of shell module it is connected to and enable one or more different type-specific functions according to the type of shell module identified.

26. The system of claim 25, wherein said core module further comprises a real time clock for maintaining accurate time at least when said core module is disconnected from said shell module.

27. A system for a personal modular device, comprising:

a core module adapted for providing at least one generic function wherein said core module is only operative when connected to a shell module, said core module comprising a CPU and memory; and at least one of a plurality of different types of shell modules, each shell module being adapted for providing at least one type-specific function and wherein each shell module is only operative when connected to the core module, such that a single core module is operable with a plurality of different types of shell modules, wherein said type-specific functions are selected from the group consisting of a digital camera, a personal digital assistant, an electronic game, a DYD player, a toy, and a computerized device, wherein said memory stores software for operating the system, such that said core module is adapted to identify the type of shell module it is connected to and enables one or more different type-specific functions according to the type of shell module identified.

28. The system of claim 27, wherein a single shell module is operable with a plurality of different types of core modules.

29. The system of claim 28, wherein said single core module has a set of features which are generic to said plurality of different types of shell modules.

30. The system of claim 29, wherein at least one shell module includes an input component for receiving input from a user and an output component for providing output to a user.

31. The system of claim 30, wherein said core module further includes a power source and a real time clock, such that when said core module is disconnected from said shell module, said real time clock receives power from said power source.

32. A system for a personal modular device, comprising:

a core module adapted for providing at least one generic function wherein said core module is only operative when connected to a shell module, said core module comprising memory; and at least one of a plurality of different types of shell modules, each shell module being adapted to provide at least one type-specific function and wherein each shell module is only operative when connected to the core module, such that a single core module is operable with a plurality of different types of shell modules, wherein said memory stores software for operating the system, such that said core module controls is adapted to identify the type of shell module it is connected to and enables one or more different type-specific functions according to the type of shell module identified.

33. The system of claim 32, wherein the core module includes information unique to the user.

34. The system of claim 33, wherein the different types of shell modules are inoperable without the core module.

35. The system of claim 34, wherein a single shell module is operable with a plurality of different types of core modules.

36. The system of claim 35, wherein said single core module has a set of features which are generic to said plurality of different types of shell modules.

37. The system of claim 35, wherein at least one shell module includes an input component for receiving input from a user and an output component for providing output to a user.

38. A system for a personal modular device, comprising:

a card for containing at least one generic function wherein said card is only operative when connected to a shell module, said card comprising a CPU, a radio transmitter/receiver and memory; and at least one of a plurality of different types of shell modules adapted to be coupled to said card, each shell module providing at least one type-specific function and wherein each shell module is only operative when connected to said card, such that a single card is operable with a plurality of different types of shell modules, wherein said memory stores software for operating the system, such that said card module is adapted to identify the type of shell module it is coupled to and enables one or more different type-specific functions according to the type of shell module identified.

39. The system of claim 38, wherein said shell module further comprises at least one of a docking station or a slot connector.

40. The system of claim 38, wherein said card comprises a memory card.

41. The system of claim 40, wherein said memory card comprises a PCMCIA card.

42. A system for a personal modular device, comprising:

a card adapted for providing at least one generic function wherein said card is only operative when connected to a shell module, said card comprising a CPU and memory; and at least one of a plurality of different types of shell modules adapted to be coupled to said card, each shell module providing at least one type-specific function and wherein each shell module is only operative when connected to said card, such that a single card is operable with a plurality of different types of shell modules, wherein said type-specific functions are selected from the group consisting of a digital camera, a personal digital assistant, an electronic game, a DVD player, a toy, and a computerized device, wherein said memory stores software for operating the system, such that said card is adapted to identify the type of shell module it is connected to and enables one or more type-specific functions according to the type of shell module identified.

43. A system for a personal modular device, comprising:

a card for containing at least one generic function wherein said core module is only operative when connected to a shell module, said card comprising a CPU and memory; and at least one of a plurality of different types of shell modules adapted to be coupled to said card, each shell module providing at least one type-specific function and wherein each shell module is only operative when connected to said card, such that a single card is operable with a plurality of different types of shell modules, wherein said type-specific functions are selected from the group consisting of a digital camera, a personal digital assistant, an electronic game, a DVD player, a toy, and a computerized device, wherein said memory stores software for operating the system, such that said card is adapted to identify the type of shell module it is connected to and enables one or more type-specific functions according to the type of shell module identified.

44. The system of claim 43, wherein said shell module further comprises at least one of a docking station or a slot connector.

45. The system of claim 43, wherein said card comprises a memory card.

46. The system of claim 45, wherein said memory card comprises a PCMCIA card.

47. The system of claim 43, wherein said type-specific function is said personal digital assistant and said card supports a Web browser.

* * * * *

UNITED STATES PATENT AND TRADEMARK OFFICE

CERTIFICATE OF CORRECTION

PATENT NO. : 7,593,723 B2
APPLICATION NO. : 10/476177
DATED : September 22, 2009
INVENTOR(S) : Zarom et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 341 days Delete the phrase "by 341 days" and insert -- by 522 days --

Signed and Sealed this

First Day of June, 2010

David J. Kappos
*Director of the United States Patent and Trademark Office*